No. 767,955. PATENTED AUG. 16, 1904.
E. W. POTTS.
SELF LUBRICATING TROLLEY WHEEL.
APPLICATION FILED FEB. 8, 1904.
NO MODEL.
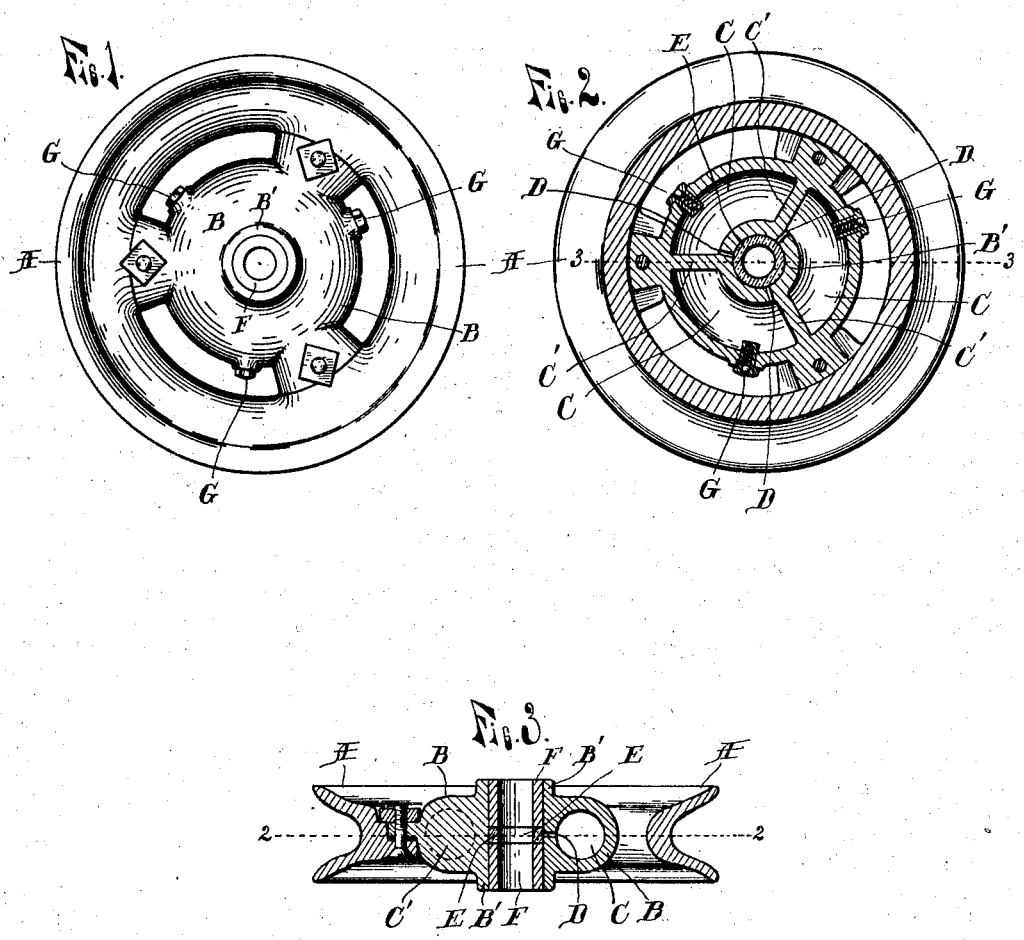
WITNESSES.
Lewis E. Flanders
Thomas G. Longstaff
INVENTOR.
Elijah W. Potts,
By
Attorneys.

No. 767,955.

Patented August 16, 1904.

UNITED STATES PATENT OFFICE.

ELIJAH W. POTTS, OF DETROIT, MICHIGAN, ASSIGNOR TO DETROIT TROLLEY WHEEL AND ELECTRICAL EQUIPMENT COMPANY, OF DETROIT, MICHIGAN, A CORPORATION.

SELF-LUBRICATING TROLLEY-WHEEL.

SPECIFICATION forming part of Letters Patent No. 767,955, dated August 16, 1904.

Original application filed January 12, 1903, Serial No. 138,594. Divided and this application filed February 8, 1904. Serial No. 192,649. (No model.)

*To all whom it may concern:*

Be it known that I, ELIJAH W. POTTS, a citizen of the United States of America, residing at Detroit, in the county of Wayne and State of Michigan, have invented certain new and useful Improvements in Self-Lubricating Trolley-Wheels, of which the following is a specification, reference being had therein to the accompanying drawings.

My invention relates to improvements in trolley-wheels, and has for its object to provide a self-lubricating wheel in which the lubricant is stored in suitable reservoirs and conducted therefrom in such a manner that the bearing is thoroughly but not excessively lubricated, the construction also being such that all of the oil in the reservoirs may be drawn off.

To this end the invention comprises a series of annular reservoirs in the hub member around the bearing, to which bearing the oil is conducted through small ducts which lead to an absorbent ring surrounding the shaft and in contact therewith, the invention especially consisting in providing certain new and useful features, as hereinafter more fully described, and particularly pointed out in the claims, reference being had to the accompanying drawings, in which—

Figure 1 is a side elevation of a device embodying my invention; Fig. 2, a section of the same on the line 2 2 of Fig. 3; Fig. 3, a section on the line 3 3 of Fig. 2.

As shown in the drawings, A is the rim, and B the hub member, of the wheel. The rim is of the ordinary form, being provided with outwardly-projecting flanges which form the peripheral groove to engage the trolley-wire, and the hub portion is provided with an annular chamber, which surrounds the hub proper, B', and is divided into three reservoirs C C C by the partitions C'. Adjacent to each of these partitions and leading from each reservoir through the hub B' is a duct D, which ducts communicate with a ring of felt E or other absorbent material held within the hub intermediate its ends by the bushings F F, which are driven in from each end of the hub and leave a space between their inner ends for said ring E, which is thus held in wiping contact with the shaft on which the wheel turns and is kept saturated with lubricant from the ducts D, two only of which can feed at one time and then only when the wheel is at rest, as when it is revolved the oil is thrown outward against the outer wall of the reservoirs by centrifugal force, and none will enter the ducts. Oil is therefore supplied to the bearing only in such amounts as is necessary to keep it thoroughly lubricated and not in such quantity that it will run out at the ends of the bearing. It will be observed that the reservoirs are circular in cross-section and that the ducts are located adjacent to the walls, so that all of the oil contained in the reservoirs will run out through the ducts, and a valve G is provided in the outer wall of each reservoir through which it is filled, this application, divided out from my previous application, filed January 12, 1903, Serial No. 138,594, claiming the separable rim.

While I have shown my invention as applied to a trolley-wheel with a separable rim, it is obvious that it may be applied as well to a solid trolley-wheel or ordinary pulleys, as I do not wish to limit myself in its application.

To regulate the amount of oil fed to the bearing, depending upon whether the wheel is used at high or low speeds, by reversing the wheel so that the ducts D of each reservoir will be first or last over the center the amount of oil fed to the bearing can be varied, as I find in using my wheel upon suburban cars, where there are long runs at high speed and few stops, the oil should be forced to the bearing, while upon cars in city use, where the stops are frequent and the speed slow, the oil should not be fed so fast, all of which I am enabled to accomplish with my construction by a mere reversal of the wheel.

Having thus fully described my invention, what I claim is—

1. In a self-lubricating wheel, the combination of a rim member and a hub member, the hub member being substantially in the form of a flattened sphere, and comprising an axle-bore, partitions extending from the axle-bore to the outer walls and dividing the space into annular chambers or reservoirs substantially circular in cross-section, and a duct leading from each chamber or reservoir to the axle-bore.

2. In a self-lubricating wheel, the combination of a rim member and a removable and reversible hub member, the hub member comprising an axle-bore, partitions leading from the axle-bore to the outer wall of the hub member and dividing the space into chambers or reservoirs, valves in the outer wall leading into the chambers or reservoirs, there being a duct in each chamber leading to the axle-bore and lying adjacent the bases of the separating-arms.

In testimony whereof I affix my signature in presence of two witnesses.

ELIJAH W. POTTS.

Witnesses:
   OTTO F. BARTHEL,
   LEWIS E. FLANDERS.